(12) United States Patent
Hoehe et al.

(10) Patent No.: US 9,897,208 B2
(45) Date of Patent: Feb. 20, 2018

(54) FLAT GASKET (71) Applicant: REINZ-DICHTUNGS-GMBH, Neu-Ulm (DE)

(72) Inventors: Kurt Hoehe, Langenau (DE); Robert Blersch, Baltringen (DE); Guenther Unseld, Neenstetten (DE)

(73) Assignee: Reinz-Dichtungs-Gmbh, Neu-Ulm (DE)

( * ) Notice: Subject to any disclaimer, the term of this patent is extended or adjusted under 35 U.S.C. 154(b) by 207 days.

(21) Appl. No.: 14/392,027

(22) PCT Filed: Sep. 20, 2013

(86) PCT No.: PCT/EP2013/069554
§ 371 (c)(1),
(2) Date: Mar. 16, 2015

(87) PCT Pub. No.: WO2014/053335
PCT Pub. Date: Apr. 10, 2014

(65) Prior Publication Data
US 2015/0198250 A1    Jul. 16, 2015

(30) Foreign Application Priority Data

Oct. 5, 2012   (DE) .................... 20 2012 009 539 U (51) Int. Cl.
*F16J 15/08*    (2006.01)
*F16J 15/06*    (2006.01)
(Continued)

(52) U.S. Cl.
CPC ...... *F16J 15/0818* (2013.01); *F16H 61/0009* (2013.01); *F16J 15/062* (2013.01);
(Continued)

(58) Field of Classification Search
CPC .... F16J 15/064; F16J 15/0818; F16J 15/0831; F16J 15/0868; F16J 15/122; F16K 15/02; F16K 15/021; F16K 15/022; F16K 15/04; F02F 11/002; F16H 61/0009
See application file for complete search history.

(56) References Cited

U.S. PATENT DOCUMENTS 4,907,616 A * 3/1990 Bergsma ............... F16K 15/023
                                                        137/38
5,469,884 A * 11/1995 Madrid ................. F16K 15/026
                                                        137/515.7
(Continued)

FOREIGN PATENT DOCUMENTS

DE           20102642 U1     6/2001
DE        102004031458 A1    1/2006
(Continued)

*Primary Examiner* — Nicholas L Foster
(74) *Attorney, Agent, or Firm* — Marshall & Melhorn, LLC (57) ABSTRACT

A flat gasket with at least one extended carrier layer is described. Such flat gaskets are for instance used as transmission plates or also as cylinder head gaskets. They are also used in the area of the exhaust line of a combustion engine. The at least one extended carrier layer has a first surface and a second surface opposite to the first surface. The layer also has a passage opening for a fluid which penetrates the carrier layer. The circumferential edge of each of the two surfaces has one or several projections which encircle the passage opening at least in sections and protrude into the passage opening. A functional element is arranged in the passage opening, which is held by the one or several projections in the passage opening.

21 Claims, 8 Drawing Sheets (51) Int. Cl.
*F16K 15/02* (2006.01)
*F16H 61/00* (2006.01)

(52) U.S. Cl.
CPC ......... *F16J 15/064* (2013.01); *F16J 15/0825* (2013.01); *F16J 2015/0856* (2013.01); *F16J 2015/0868* (2013.01); *F16K 15/023* (2013.01)

(56) References Cited

U.S. PATENT DOCUMENTS

| | | | | |
|---|---|---|---|---|
| 5,544,902 | A * | 8/1996 | Belter | F16J 15/061 |
| | | | | 277/598 |
| 5,791,660 | A | 8/1998 | Belter | |
| 6,305,420 | B1 * | 10/2001 | Atkinson | F01M 1/16 |
| | | | | 123/196 R |
| 6,662,791 | B2 * | 12/2003 | Nakamizo | F01M 13/0011 |
| | | | | 123/572 |
| 2003/0150437 | A1 * | 8/2003 | Nakamizo | F01M 13/0011 |
| | | | | 123/572 |
| 2005/0279295 | A1 * | 12/2005 | Vialard | F01P 7/14 |
| | | | | 123/41.74 |

FOREIGN PATENT DOCUMENTS

| | | | |
|---|---|---|---|
| DE | 202010006768 U1 | 8/2010 | |
| DE | 102009024091 A1 | 12/2010 | |
| DE | 202009018646 U1 | 5/2012 | |
| JP | H084900 A | 1/1996 | |
| WO | 2010/072402 A1 | 7/2010 | |

\* cited by examiner

Figur 3-A

Figur 3-B

Figur 3-C

Figur 3-D

FLAT GASKET

BACKGROUND

The present invention relates to a flat gasket with at least one extended carrier layer. Such flat gaskets are for instance used as transmission plates or also as cylinder head gaskets. They are also used in the area of the exhaust line of a combustion engine.

Such flat gaskets often comprise a passage opening for a fluid through which the fluid can stream from one side of the flat gasket to the opposite side of the flat gasket. In addition, functional elements may be inserted into such passage openings, e.g. valve elements, which block the passage in one direction or orifice elements, which delimit the passage in one or both directions.

Fastening of such functional elements within the flat gasket is usually achieved by additional measures or a particular design of additional, functional layers adjacent to the carrier layer or by a particular design of the parts to be sealed. This way of fastening the functional elements is laborious and costly and can only be realized for particular gasket designs.

BRIEF SUMMARY

In view of this state of the art, it is the object of the present invention to provide for flat gaskets as well as their use, which comprise an extended carrier layer and in which functional elements such as for example valve elements or orifice elements can be fastened in a simple, cost-efficient, loss-prevented and reliable manner. It shall further be possible to perform the fastening of the functional element in an automated manner so that a simple and cost-efficient production process can be realized.

This object is solved by a flat gasket according to claim 1. Advantageous embodiments of the flat gasket according to the invention are given in the dependent claims.

The inventive flat gasket according to claim 1 comprises at least one extended carrier layer. Adjacent to the carrier layer, further functional layers, such as gasket layers, can be arranged in an advantageous manner.

In contrast to the known state of the art, no further layers or additional fixation elements are required in order to mount the functional element in a loss-prevented manner in a passage opening leading through the carrier layer. Rather, the circumferential edge of the passage opening of the carrier layer according to claim 1 is designed in such a way that each of the circumferential edges at least in sections around the passage opening comprises projections, which protrude into the passage opening. There remains an area, which is situated between the surfaces of the functional element or to be more precise between the projections, in which no projections are provided. This means that the carrier layer on both of its sides along the circumferential edge of the passage opening comprises projections, which together with the passage opening form a kind of groove. This "groove" can encircle the passage opening along its circumferential edge in a continuous manner or only in sections. Further, the groove may not only be formed by projections situated one opposite to the other, but also by projections on both sides of the groove which are shifted relative to each other in the circumferential direction. In this groove, a functional element is seated, so that the functional element is located within the passage opening.

The projections and the functional element are formed in such a way that the functional element is moveable in the passage opening. However, when it is pressed against one of the surfaces of the carrier layer by a fluid streaming through the passage opening, it knocks against the projection(s) encircling the passage opening on this side and therefore, it is seated in a loss-prevented manner, as the knocking against the projection(s) in this direction causes a form-locking connection between the functional element and the projection(s), which prevents from a further shift of the functional element. If the fluid streams in the opposite direction, the functional element is pushed in the opposite direction until it comes into a force-locking engagement with the projections on the other side of the carrier layer and thus is prevented from leaving the passage opening. The form-locking connection here is to be understood as an intermittent one-sided form-lock, where one of the surfaces of the functional element rests on the opposite surface of the projection(s) and cannot be moved further in the direction of this projection or these projections. As long as a sufficiently high fluid pressure is present, the functional element cannot move in the opposite direction, either. It is thus a combined force- and form-locking connection, which shall also be referred to as such in the following.

In a further embodiment of the invention, the carrier layer between its two surfaces along the circumferential edge of the passage opening on the inner side of the circumferential edge of the passage opening at least in sections comprises a web-shaped projection, which may be interrupted in sections. In this embodiment, it is the functional element that is designed in such a way that it comprises projections on both its surfaces, which projections protrude along the outer circumferential edge outwardly. The projections located on both sides of the functional element together form a kind of groove that encircles the outer edge of the functional element in a continuous or in an interrupted manner and embrace the web-like projections of the carrier layer. The web-like projections of the carrier layer thus act as tongue. This "tongue" can encircle the circumferential edge of the passage opening in a continuous manner or only in sections. The groove again may not only consist in projections arranged one opposite to the other, but may also be formed by projections that are shifted relative to each other on both surfaces of the functional element.

It is essential that the passage opening continuously extends from one surface to the other surface of the carrier layer and thus provides for a passage for the fluid through the entire carrier layer including the projections. The functional element is situated in the passage opening and essentially fills the lumen of the passage opening without blocking the fluid passage in all operational conditions completely.

If the clear width of the distance of the projections of the functional element measured orthogonal to the carrier layer—meaning in the passage direction through the passage opening—is larger than the thickness of the web-shaped projection in the carrier layer, then the functional element on the one hand is seated in a moveable way with respect to the passage direction and is sterically prevented from leaving the passage opening by the combined force- and form locking connection which is possible on both surfaces.

The projections in the carrier layer or in the functional element in both embodiments do not need to completely encircle the passage opening along its entire outer edge. It is sufficient if they are given in sections, so that in every moment the edge of the functional element or of the carrier layer, respectively, and the projections in the carrier layer or in the functional element, respectively, overlap in a sufficient amount of sections to an acceptable extent in order to hold the functional element in a loss-proof manner in the passage opening.

To this end, two, advantageously three overlapping areas distanced to each other are sufficient.

Typically, the carrier layer comprises a thickness of >1 mm, preferably ≥1.5 mm, most preferably ≥2 mm. With respect to its maximum thickness, the thickness of the carrier layer is limited to ≤5 mm, preferably ≤3 mm and most preferably ≤2.8 mm.

In the first embodiment, the thickness of the areas of the functional element that overlap with the projections of the carrier layer is advantageously selected in such a way that it corresponds to at the most 80%, preferably ≤60% of the clear span between the projections formed at the two surfaces of the carrier layer. In a second embodiment, the thickness of the web-like projections in the carrier layer amounts to at the most 80%, preferably ≤60% of the clear width of the groove formed by the projections in the functional element. This way, the functional element is seated in a moveable manner in the passage opening, but is nevertheless held in a loss-proof manner in the passage opening.

Each flat gasket according to the invention may thus advantageously be designed in such a manner that the circumferential edge of the passage opening along the circumferential edge of each of the two surfaces comprises one or several projections which each encircle the passage opening at least in sections and protrude into the passage opening. The thickness of the functional element in the area, in which it overlaps with one or several of the projections of the carrier layer, corresponds to the clear distance between the projections along the circumferential edge of the first surface and the projections along the circumferential edge of the second surface. As an alternative, it corresponds to ≤80%, preferably ≤60% of the clear width between the projections along the circumferential edge of the first surface and the projections along the circumferential edge of the second surface.

The functional element may for instance be a valve closure, which on one side of one surface of the carrier layer over its entire circumferential edge overlaps with the projections of the carrier layer. If a streaming medium presses the functional element to this side of the carrier layer, the passage opening is closed by the functional element. On the other surface of the carrier layer, the projections of the carrier layer may be designed in such a way that the projections of the carrier layer overlap with the circumferential edge of the functional element only in some sections. Then, medium can flow between the circumferential edge of the functional element and the circumferential edge of the carrier layer in the other areas. If a fluid stream thus presses the functional element on the projections overlapping only in sections, medium can nevertheless flow past the functional element. In general, this leads to a valve function which results from the design of the passage opening in the carrier layer and the design of the functional element.

The functional element may however also overlap on both sides of the carrier layer all-over with the projections in the carrier layer and this way close the passage opening in the area of the projections in both directions. Further, the functional element may comprise a bore, which allows medium to pass from one side to the opposite side of the functional element even though the projections block the passage opening. This way, the functional element forms a orifice for the fluid passage. This orifice function can also be given in addition to the valve function. In particular, the bore may be designed in such a way that only on one of its sides, it knocks only against a passage opening in the adjacent part and on its other side upon knocking against the adjacent part is closed. As an alternative, it may knock against openings of different size in the adjacent parts on its respective sides.

In the further embodiment, a valve function and/or a orifice function can be realized in the same or an analogous manner if the circumferential edge of the functional element forms a groove in radial direction, into which the web-shaped projections of the carrier layer protrude in sections.

For the valve function, the projections at the outer edge of the carrier layer along their entire circumferential edge overlap with the projections on at least one surface of the functional element. If the overlap is realized on one surface only, this usually results in a return valve, with an overlap on both surfaces a stop valve is obtained. In the stop valve as in the first embodiment, an orifice function can be realized with a bore.

In addition, the functional element on at least one of its surfaces may circumferentially comprise a sealing element, e.g. a ring-shaped sealing profile, so that an improved sealing effect is achieved between the functional element and a circumferential projection on one side of the carrier layer.

In this respect, it is preferred if the functional element is not formed with a constant thickness but comprises a tapered peripheral area, in particular a circumferentially extending tapered peripheral area. It is preferred that the functional element on one, however preferably on both surfaces of the tapered peripheral area comprises a sealing element, e.g. a sealing lip encircling the passage opening in a self-contained manner, which upon abutting of the functional element against a circumferential projection on one side of the carrier layer ascertains the sealing. In the same way, it is possible to provide the functional element on one or both its surfaces at least in sections with a coating, which improves the sealing effect when it contacts one of the surfaces.

It is the task of the functional element to move in the respective flow direction of the fluid or to rest against the projection(s) to which it is pressed by the fluid stream. Doing so, the functional element may remain dimensionally stable. Thus, the functional element may neither be bent nor stretched by the fluid stream in a detectable manner. The functional element preferably consists of metal or a plastic material or comprises such. Typical metallic materials are made from metal sheet, in particular steel sheets, e.g. stainless steel, carbon steel, spring steel and spring hard steel. Light metals can in principle be used as well. The plastic material preferably is to be stable against oil and/or temperatures of up to about 150° C. and/or pressures of up to 40 bar. This allows for the use of a large range of thermoplastic, elastomeric and duroplastic, also known as thermoset, materials. Typical preferential thicknesses of the valve plate in its centre area are between 0.7 and 1.6 mm, preferably between 0.6 and 1.2 mm. If the functional element is made from light metal, it is preferred to use greater thicknesses and to adapt the thickness of the carrier layer accordingly.

Suitable thermoplastic materials comprise polyamide (PA), polyphthalamide (PPA), polyether ether ketone (PEEK), polyphenylene sulfide (PPS), polytetrafluoroethylene (PTFE), polysulfone (PSU), polyphenylsulfone (PPSU), polyethersulfone (PES), polyetherimide (PEI), polyimide (PI), polyamide imide (PAI), polybenzimidazole (PBI) and polypropylene (PP). Suitable elastomeric materials comprise polyacrylate rubber (e.g. ACM and AEM), fluoroelastomer (FKM), fluorosilicone rubber (FVMQ), hydrated nitrilebutadiene rubber (HNBR), silicone rubber (VMQ) and epichlorohydrin (ECO). Suitable duroplastic, also known as thermoset, materials comprise polyester, vinyl ester, phenolic resin and melamine resin. These materials can be used alone or as two- or multi-component elements. They can be used without reinforcement or with fibre- and/or particle-based reinforcement.

The carrier layer is preferably made from a metal sheet, especially from a steel sheet, e.g. stainless steel and carbon steel. Typical thicknesses range between 1.0 and 5.0 mm.

As exemplified by FIGS. 1 to 7 and the above mentioned first embodiment according to claim 1 with projections being situated on the circumferential edge of the passage opening of the carrier layer on both of its surfaces, it is preferred that the heights of the projections correspond to less than ⅓, advantageously to less than ⅕ of the thickness of the functional element in its centre area. As exemplified in FIG. 8 and the above mentioned further embodiment with projections being situated on the circumferential edge of the passage opening of the carrier layer in its middle range, thus distanced to both of its surfaces, it is preferred that the height of the projections corresponds to less than ½, advantageously to less than ⅓ of the thickness of the functional element in its centre area. In general, it is preferred that the functional element does not protrude beyond the surface of the carrier layer in the direction of which it is pressed.

In a conventional way and as already mentioned above, additional functional layers can be arranged adjacent to the carrier layer, such as for instance sealing layers. These can be provided with sealing elastomeric coatings and/or with sealing beads. However, it is essential for the present invention that even a gasket that consists of only one carrier layer is able to hold the functional element in a loss-prevented manner in the passage opening. Given the different designs of the circumferential edges of the passage opening in the carrier layer as well as of the circumferential edge of the functional element, it is possible to achieve a particular functional behaviour of the functional element as described above.

It is further possible to design the counterparts to be sealed in such a manner that further valve or orifice functions can be realized and/or that the sealing effect can be improved. A valve function can for instance be realized if the projections of the functional element and of the carrier layer do only overlap in sections with each other, but the projections of the functional element (in the second embodiment at least on one of the surfaces of the functional element) can come to rest in a circumferential manner on the surface of the counterpart to be sealed, so that the combined force- and form-locking connection here is realized between the functional element and the counterpart and the passage between the functional element and the counterpart is blocked. An orifice function results if passages, which in the contact area in which the functional element and the carrier layer can rest one on the other, do not abut to passage openings all-over, but are closed only in sections by the counterpart. Comparable effects as in the interaction between carrier layer, functional element and counterpart to be sealed results, if the flat gasket at least on one of its surfaces comprises a sealing layer which effect then results from a corresponding interaction between the areas of the carrier layer and of the functional element delimiting the passage opening and the sealing layer. It is essential for the invention that the functional element is held by the carrier layer only.

As a general advantageous inventive feature when in form- and force-locking engagement with the carrier layer, the functional element does not protrude beyond the surface or beyond both surfaces of the carrier layer in the direction of which it is pressed.

In the following, some examples of flat gaskets according to the invention are given. Here, identical or similar elements are referred to with identical or similar reference numbers, so that the description in part is not repeated. The individual characteristics in each of the following examples do not only represent an embodiment of the invention in combination with all other characteristics of the respective example, but are also to be considered as advantageous embodiments of the flat gasket according to the invention when considered in an isolated manner.

BRIEF DESCRIPTION OF THE DRAWINGS

It is shown in

FIG. 2-A A sectional view orthogonal to the drawing plane in FIG. 1 along line A-A of the first flat gasket:

FIG. 2-B A sectional view orthogonal to the drawing plane in FIG. 1 along line A-A of the first flat gasket:

FIG. 2-C A sectional view orthogonal to the drawing plane in FIG. 1 along line B-B of the first flat gasket;

FIG. 2-D A sectional view orthogonal to the drawing plane in FIG. 1 along line B-B of the first flat gasket;

FIG. 3-A A detailed view of a passage opening of a gasket;

FIG. 3-B A detailed view of a passage opening of a gasket;

FIG. 3-C A detailed view of a passage opening of a gasket;

FIG. 3-D A detailed view of a passage opening of a gasket;

FIG. 4-A A schematic view onto the top/through an area of a passage opening of a gasket;

FIG. 4-B A view along line D-D of FIG. 4-A;

FIG. 4-C A view along line E-E of FIG. 4-A;

FIG. 6-A A section view through the area of a passage opening according to another embodiment;

FIG. 6-B A section view through the area of a passage opening according to the embodiment from FIG. 6-A;

FIG. 7-A A section view through the area of a passage opening according another embodiment;

FIG. 7-B A section view through the area of a passage opening according to the embodiment from FIG. 7-A;

FIG. 8-A A section view through an area of a passage opening of another embodiment; and FIG. 8-B A top view of an area of a passage opening of the embodiment from FIG. 8-A.

DETAILED DESCRIPTION

Figure 1:
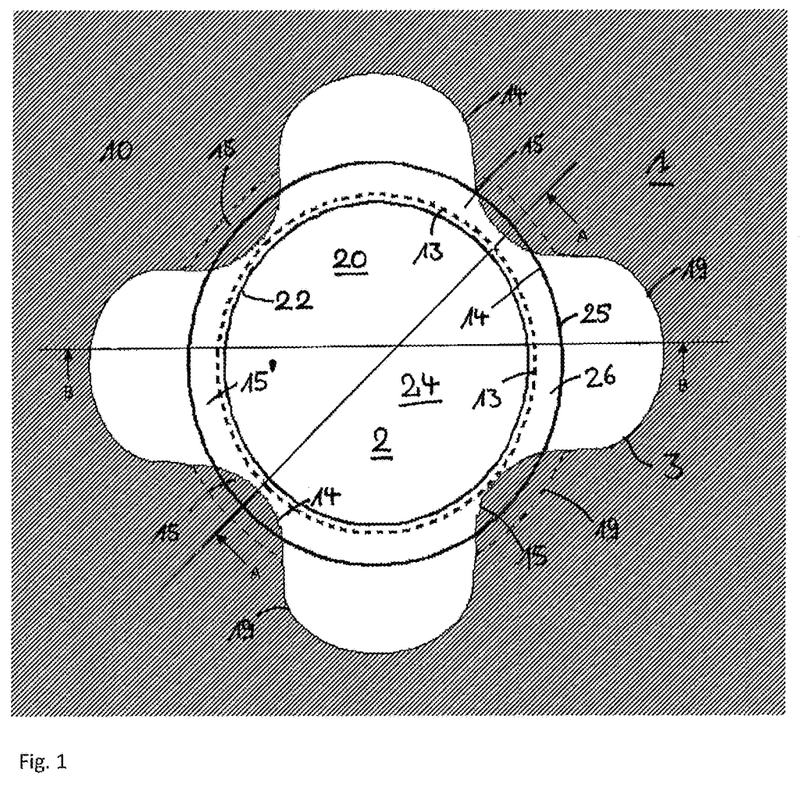
FIG. 1: A schematic view onto the top/through an area of a passage opening in a carrier layer of a first flat gasket according to the invention.

FIG. 1 shows a top view to a carrier layer 10 as well as to a functional element 20 of a flat gasket 1 according to the invention, with the contours of carrier layer 10, namely the inner contour, and of the functional element, namely the outer contour, being represented in a transparent way. The carrier layer 10 is shown in a section around a passage opening 2. The passage opening shows a circumferential edge 3 between the two surfaces of the carrier layer 10, which encircles the passage opening. The functional element 20 around its center area 24 comprises a flange-like land 26 which comprises a circumferential outer edge 25. In the present example, the functional element 20 is a disk with an inner area with a first thickness and an outer edge, the flange-shaped land, with a second thickness. The step between the two thicknesses is indicated with reference number 22. The disk is rotationally symmetric with respect to an axis that stands orthogonally on the drawing plane. The disk here is moulded from a thermoplastic material, namely particle-reinforced polyamide. The carrier layer 10 comprises a circumferential projection 15' in the area of its surface which is situated below the plane of the functional element 20. This circumferential projection 15' comprises a circumferential edge 13 of the passage opening 2, which in turn is rotationally symmetric, too, and shows a smaller radius than the circumferential edge 25 of the functional element 20. Thus, if the functional element 20 is pressed against the circumferential edge 13 of the carrier layer below the plane of the drawing, the passage opening 2 is closed.

On its surface located above the drawing plane, the carrier layer 10 comprises a circumferential edge 14, which as a whole shows four projecting areas 15 having equal distance among each other. In its entirety, the circumferential edge of the upper surface of the carrier layer in sections forms circumferential projections with the projections being most pronounced in the areas 15 and protrude in such a way into the passage opening 2 that they overlap with the edge 25 of the functional element 20.

Between the surrounding circumferential edges 13 and 14, the carrier layer shows a circumferential edge 19, which is recessed with respect to the lower circumferential edge 13 in a circumferential manner and with respect to the upper circumferential edge 14 in the area of the projections 15. This way, it forms a groove which in the following will be referred to as 17. In other words, the functional element 2 with its circumferential edge 25 in the area of the protruding areas 15 extends into this groove 17. If the functional element 20, e.g. due to an upward fluid stream, is pressed against the protruding areas 15, the fluid can nevertheless pass through the passage opening 2 between the circumferential edge 25 of the functional element and the circumferential edge 14 of the carrier layer, namely in the areas located in between the pronouncedly protruding areas 15.

Figure 2:
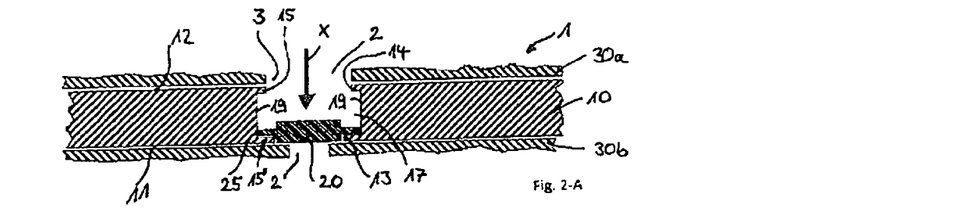

FIGS. 2-A and 2-B show sections along line A-A in FIG. 1 and in FIGS. 2-C and 2-D sections along line B-B in FIG. 1.

In FIGS. 2-A to 2-D, X represents the respective flow direction of the fluid through the passage opening 2. In these sectional views, adjacent to the carrier layer 10, both above the upper surface 12 of the carrier layer 10 and below the lower surface 11 of the carrier layer 10, an additional functional layer 30a and 30b, respectively, is arranged. These functional layers serve for instance as sealing layers towards the adjacent parts to be sealed. The functional layers can however also be replaced by the parts to be sealed themselves, which would result in the same drawings as in FIGS. 2-A to 2-D with the reference numbers 30a and 30b then designating the actual parts to be sealed.

As is shown in FIGS. 2-A to 2-D, the clear width of the passage opening in layer 30a—measured in the plane of the layer—corresponds to the clear width of the protruding areas 15 at the upper edge of the carrier layer 10 in section A-A (see FIGS. 2-A and 2-B), while outside the protruding areas 15 the passage opening 2 is constricted by the opening in the layer 30a.

In FIGS. 2-A to 2-D the clear width of the passage opening in the additional layer 30b is smaller than the clear width of the circumferential edge 13. The constricted opening in the layer 30b thus serves as an orifice or valve closure for the passage of a fluid through passage opening 2.

If a fluid tries to flow according to direction X in FIGS. 2-A and 2-C from above the carrier layer 10 through the passage opening 2—which corresponds to a flow direction orthogonal into the drawing plane in FIG. 1—the functional element 20 rests immediately on the surrounding projection 15' and this way blocks the passage.

If the passage, as shown in FIGS. 2-B and 2-D is effected in the opposite direction—this corresponds to a flow direction out of the drawing plane in FIG. 1—then the functional element 20 is pressed upwardly against the projecting areas 15. In this position of the functional element, the fluid can pass past the functional element 20 in the unobstructed areas between the edge 25 of the functional element and the circumferential edge 14, as is made clear in the sectional view of FIG. 2-D. Doing so, the functional element 20 is kept within the carrier layer by the four projections 15. In both flow directions, the functional element 20 comes to rest against the corresponding projections of the carrier layer 10 and therefore, a combined force- and form-locking connection is achieved. This causes a loss-prevented seating of the functional element 20 within the passage opening 2 of the carrier layer 10.

Figure 3:
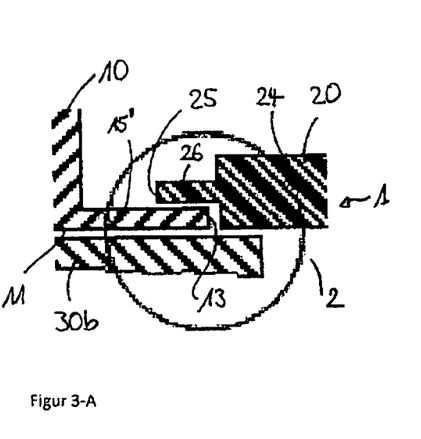

The four partial FIGS. 3-A to 3-D, show four opportunities for a sealing between the functional element 20 and the projections 15' of the carrier layer 10. These ways of sealing can be applied in a corresponding manner to other areas, e.g. the projections, too, if required. In FIGS. 2-A, 2-B, 2-C, 2-D, 3-A, 3-B, 3-C and 3-D, the thickness of the functional element 20 is not constant over its entire diameter. Rather, the peripheral edge of the functional element is formed as a projecting section 26 with a reduced thickness which can also be regarded as a land. The height reduction between the centre area 24 and the land 26 results from a circumferential orthogonal step 22. The projecting land 26 in FIGS. 3-A, 3-B, 3-C and 3-D rests on the projections 15' of the carrier layer 10.

In FIG. 3A, no additional sealing element is provided between the projection 26 and the projection 15'. In FIG. 3B, the sealing of this area is further improved by a circumferential elevation 28 arranged as an additional sealing element on the surface of the center area 24 of the functional element 20 which surface faces the additional layer 30b. With appropriate fluid stream, this additional sealing element 28 is pressed against the additional layer 30b, forms a revolving sealing line and this way completely seals the passage opening 2. In addition, in both embodiments, the surface of the projections 15' facing the functional layer 20 or the surface of the additional layer 30b can be coated appropriately, e.g. by a partial or complete coating 47 based on an elastomer or a thermoset. This causes that the sealing between the functional element 20 and the projection 15' or the further layer 30b, respectively, is further improved, as is shown in FIG. 3-C. Instead of an elevation formed from the material of the functional element 20, a sealing lip 38 made of elastomeric sealing material can be applied, formed-on and/or moulded-on revolvingly, as is illustrated in FIG. 3-D. While with polymer-based functional elements, it suggests itself that sealing lips are formed-on or moulded-on, with metallic functional elements, the use of coatings is recommended, as can be seen from the partial drawings of FIGS. 4-A to 4-C.

Figure 4:
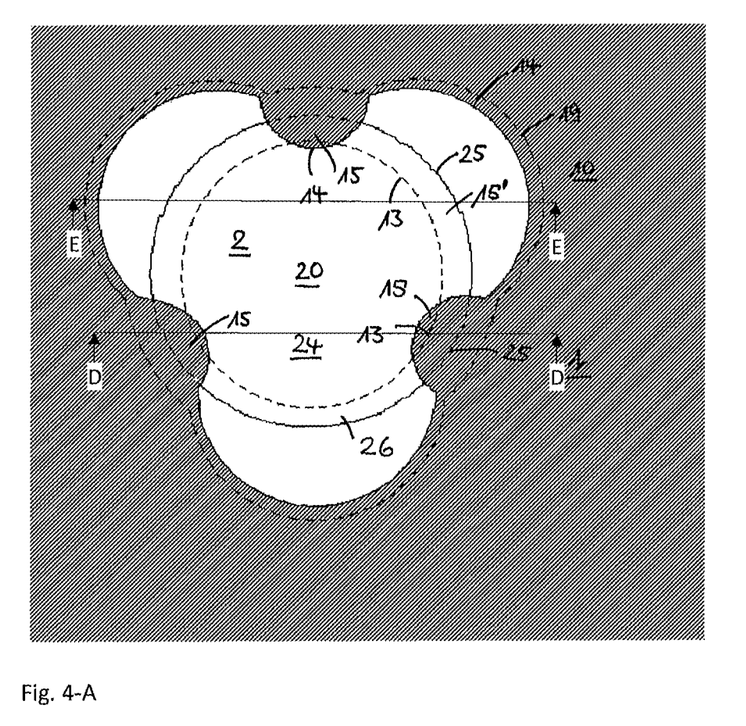

FIG. 4-A shows a further embodiment of a carrier layer and a functional element in the area of a passage opening 2 in a top-view with transparent elements as in FIG. 1. In this embodiment, only three projecting areas 15 are provided. Between the projecting areas 15, the circumferential edge 14 of the respective surface 12 of the carrier layer 10 shows pronounced recesses, which provide for a large transverse section for the passage through the passage opening 2 past the functional element 20. In contrast to the embodiment given in FIG. 1, the functional element 20 here is designed as a disk with constant thickness, thus without a tapered circumferential land at the peripheral edge, as is particularly obvious from the sectional views given in FIGS. 4-B, corresponding to section D-D from partial FIGS. 4-A, and 4-C, which correspond to section E-E from partial FIG. 4-A. They further relate to FIGS. 2-A and 2-C. The functional element 20 here is stamped as a round disk from a steel sheet.

Figure 5:
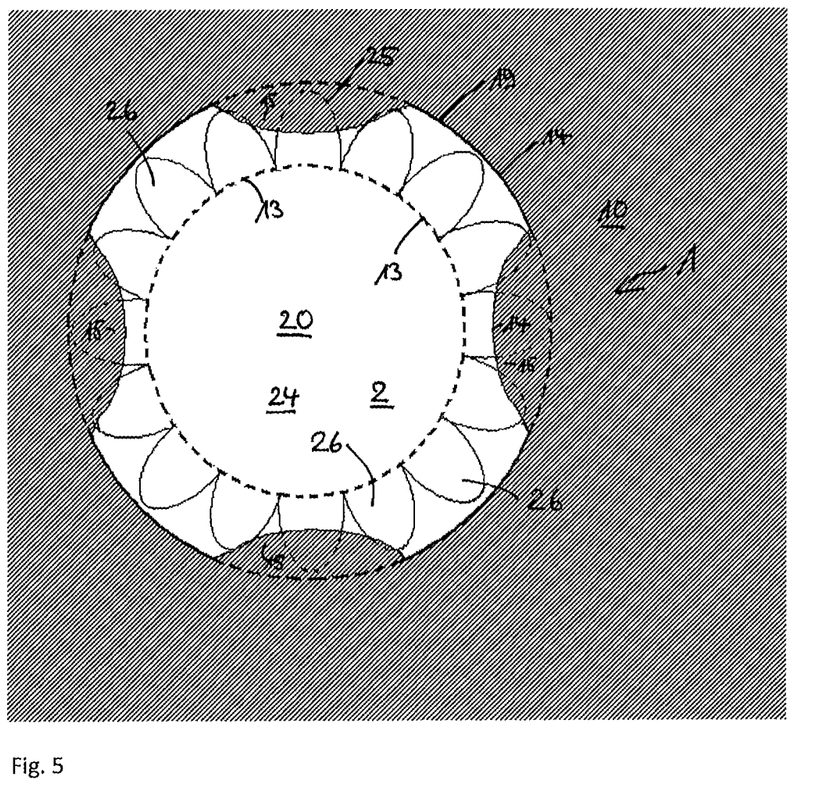
FIG. 5: A schematic view onto the top/through an area of a passage opening a flat gasket.

FIG. 5 shows a further embodiment of a flat gasket 1 according to the invention in the area of a passage opening 2 in a top-view with transparent elements as in FIG. 1. In this embodiment, as before, four projecting areas 15 are arranged at the upper circumferential edge 14 of the carrier layer 10 with a radial distance of a quarter of the perimeter of the circumferential edge 14 each. The functional element 20 now on its own shows a plurality of projecting sections 26 arranged regularly along its outer edge, which are arranged in regular distances along the circumferential edge 25 of the functional element 20. In the present example, it is sixteen areas 26, the amount may however also be selected to be lower or higher. The functional element here is stamped from a dimensionally stable PTFE material of sufficient thickness, the petals cannot bend.

Between the individual projecting sections 26, there are indentations through which a fluid may pass past the functional element 20. The projecting sections 26 are arranged like petals around the central area of the functional element 20. Given this design of the functional element 20, a rotation of the functional element 20 around an axis orthogonal to the drawing direction in the centre of the functional element does not lead to a release of the functional element from the passage opening 2. As a consequence, the functional element 20 is embraced in a secure manner between the projections 15 on the surface 12 of the carrier layer 10 and the circumferential edge 13 of the projections—here one surrounding projection—at the other surface 11 of the carrier layer 10 in the passage opening 2 in this embodiment, too. The unobstructed areas between the petal-shaped projecting areas 26 of the functional element 20 are all situated outside the inner circumferential edge 13, but within the completely surrounding projection 15' of the surface 11. They are completely covered when getting into a form-locking connecting with the surface 11 so that a blocking effect is realized in this flow direction.

Figure 6:
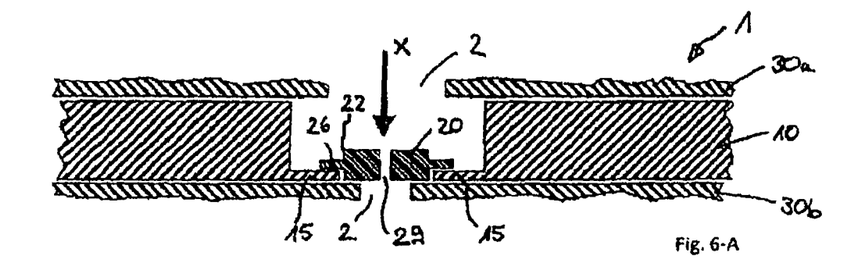

FIGS. 6-A and 6-B show a further example corresponding to the one in FIGS. 2-C and 2-D, which is only slightly different from the embodiments given in FIGS. 2-A to 2-D. In contrast to the embodiments in FIGS. 2-A to 2-D, the functional element 20 now centrally comprises an additional orifice opening 29 as a passage opening from one surface to the other surface of the functional element 20. Both in the blocking direction shown in FIG. 6-A as well as in the passage direction shown in FIG. 6-B this provides for a permanently open passage channel 29 from one side of the flat gasket 1 to the other side of the flat gasket 1 independent of the position and therefore the operational state of the functional element 20.

In other words, in the embodiment of FIGS. 6-A and 6-B, an orifice effect is achieved in flow direction X, which is shown in FIG. 6-A, while in the other flow direction X, which is shown in FIG. 6-B, the passage channel 29 in comparison to the larger passage openings surrounding the functional element, does not play any essential role.

Figure 7:
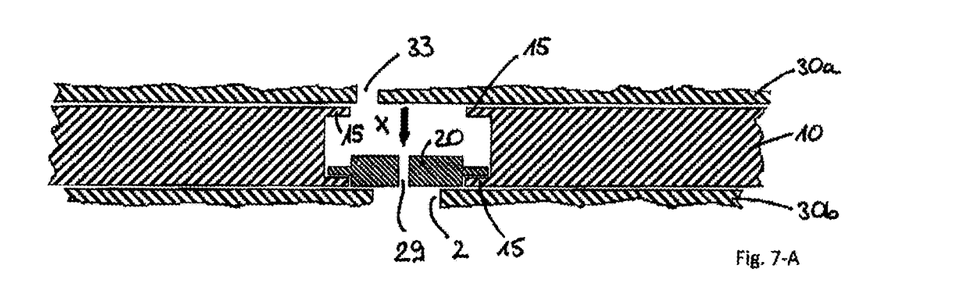

In FIGS. 7-A and 7-B, a further embodiment is shown, which apart from the embossed metallic material of the functional element 2 is similar to the embodiment of FIGS. 6-A and 6-B. In contrast to this preceding embodiment now the opening 33 in the further layer 30a is arranged outside the centre of the passage opening 2. As in FIGS. 6-A and 6-B an orifice effect of the passage opening 29 results in passage direction X, which is shown in FIG. 7-A. In FIG. 7-B it is provided that in the flow direction X the projection areas 15 of the carrier layer 10 rest against the projection sections 26 of the functional element in a form-locking manner. The passage opening as in FIGS. 6-A and 6-B is arranged centred in the functional element 20 and therefore shifted with respect to the passage opening 33 in the additional layer 30a, which causes that the additional layer 30a together with the functional element 20 causes a blocking effect for the upward passage of a fluid through the passage opening 2.

Thus, in FIGS. 7-A and 7-B an orifice effect is achieved in one direction, shown in FIG. 7-A, while the other flow direction leads to a blocking effect, as depicted in FIG. 7-B. Again, the layers 30a and 30b can represent additional sealing layers. It is however also possible that the elements 30a, 30b represent the actual counterparts to be sealed against each other. It is essential that no matter whether further layers or counterparts 30a, 30b contribute to the valve or orifice function, the functional element 20 is held by the carrier layer 10 alone.

Figure 8:
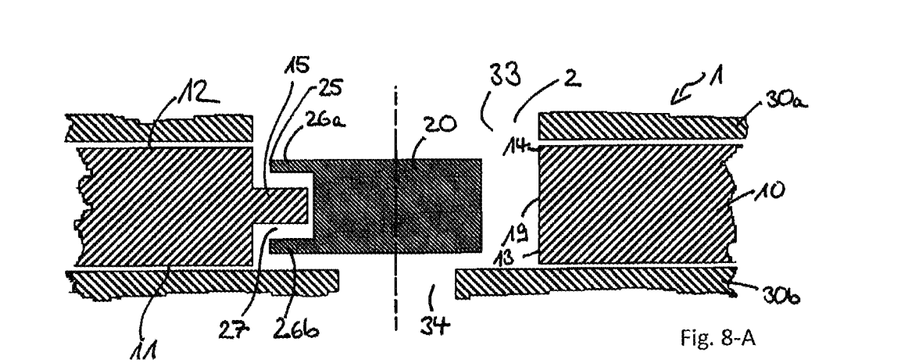

FIG. 8-A in a top-view and in FIG. 8-B in a sectional view along the tilted line C-C in FIG. 8-A shows a further embodiment which is equivalent with the embodiments of the foregoing figures. In this case, the thermoplast-based functional element 20 at its respective surfaces shows projections 26a and 26b, which in a circumferential manner at least in sections form a groove 27 around the functional element. The projecting areas 15 of the carrier layer 10 which encircle the circumferential edge of the passage opening at least in sections protrude into this groove 27 like lands. As the groove has a larger clear width than the thickness of the projection 15 of the carrier layer, the functional element 20 is seated in the passage opening 2 between the two surfaces of the flat gasket 1 in a moveable, but loss-prevented manner.

The carrier layer 10 on both sides is provided with an additional sealing layer 30a, 30b, respectively, which provide for a sealing function relative to the adjacent parts to be sealed. As an alternative, layers 30a, 30b can also represent a part of the actual parts to be sealed against each other. Further, they need not have an extended shape, as could be interpreted from the section shown in the figures. Layer 30a comprises a passage opening 33, which has the same width as the circumferential edge 14 of the carrier layer 10 adjacent to the layer 30a. Layer 30a thus comprises no additional function with respect to the flow of a fluid from one side of the flat gasket 1 to its other side. The other additional layer 30b is designed completely different. Its passage opening 34 has a smaller clear width than the circumferential edge 13 of the carrier layer 10 adjacent to the layer 30b. Therefore, the layer 30b delimits the effective passage of fluid through the passage opening 2. Further, the clear width in layer 30b is smaller than the diameter of functional element 20 at is adjacent surface. If fluid now streams through passage 33 of layer 30a through carrier layer 10 towards layer 30b, the functional element 20 is pressed against layer 30b and seals the opening in layer 30b. With this, a blocking effect in this flow direction is achieved.

In the other flow direction, the functional element 20 is pressed in the direction of layer 30a, so that now a passage is given, namely through opening 34 in layer 30*b*, through the carrier layer, by bypassing the functional element 20 and through opening 33 in layer 30*a*.

As exemplified in the examples shown for the embodiments in all the figures, as a general advantageous inventive feature when in form- and force-locking engagement with the carrier layer 10, the functional element 20 does not protrude beyond the surface of the carrier layer 10 in the direction of which it is pressed, or beyond both surfaces.

The invention claimed is:

1. A flat gasket, comprising:
 at least one extended carrier layer with a first surface, a second surface opposite to the first surface, and a passage opening for a fluid to pass through the carrier layer,
 wherein the first surface has at least one projection unitary with the at least one extended carrier layer, the at least one projection extending into the passage opening,
 wherein the second surface has a least one projection unitary with the at least one extended carrier layer, the at least one projection extending into the passage opening, and
 wherein a functional element is arranged in the passage opening, the functional element selectively retained in the passage opening by the at least one projection of the first surface and the at least one projection of the second surface, the functional element comprising a disk with an inner area with a first thickness and an outer area with a second thickness less than the first thickness, the outer area separated from the inner area by a step.

2. The flat gasket according to claim 1, wherein the at least one projection of the second surface extends along an entire circumferential edge of the passage opening and protrudes beyond an outer edge of the functional element.

3. The flat gasket according to claim 1, wherein the at least one projection of the second surface extends along a circumferential edge of the passage opening protruding beyond an outer edge of the functional element only in sections.

4. The flat gasket according to claim 3, wherein the at least one projection of the second surface extends beyond the outer edge of the functional element at regular distances in at least two areas distanced to each other.

5. The flat gasket according to claim 3, wherein the at least one projection of the second surface comprises at least three arc-shaped projecting sections spaced about the passage opening.

6. The flat gasket according to claim 1, wherein a thickness of the carrier layer is in the range of ≥1 mm.

7. The flat gasket according to claim 4, wherein the second thickness of the functional element in the area in which the functional element overlaps with the at least one projection of the first or the second surface is less than the distance between the at least one projection of the second surface and the at least one projection of the first surface.

8. The flat gasket according to claim 1, wherein the first thickness of the functional element outside of an area in which it overlaps with at least one of the projections of the carrier layer is in the range of >1 mm.

9. The flat gasket according to claim 1, wherein the functional element comprises a fluid passage opening which is spaced from its circumferential edge.

10. The flat gasket according to claim 1, wherein the functional element at least on one of its surfaces comprises an annular sealing element.

11. The flat gasket according to claim 10, wherein the revolving sealing element is a sealing profile or a sealing bead.

12. The flat gasket according to claim 1, wherein the carrier layer on at least one of its two surfaces, at least in sections, comprises sealing elements.

13. The flat gasket according to claim 12, wherein the sealing elements are elastomeric coatings.

14. The flat gasket according to claim 1, wherein at least one further layer is arranged adjacent to the carrier layer.

15. The flat gasket according to claim 14, wherein the at least one further layer comprises at least one sealing element.

16. The flat gasket according to claim 14, wherein the at least one sealing element is a bead or an elastomeric coating.

17. The flat gasket according to claim 1, wherein the carrier layer comprises metal, and the functional element comprises metal or dimensionally stable plastics.

18. The flat gasket according to claim 1, wherein the gasket is for a transmission unit or a transmission plate.

19. The flat gasket according to claim 1, wherein at least one of the projections of the first surface or the second surface form a groove in the carrier layer, the groove at least partially extending about the passage opening.

20. The flat gasket according to claim 1, wherein said carrier layer is constructed of a metallic material.

21. The flat gasket according to claim 1, wherein one of said at least one projections on said first surface or the second surface only partially encircles the passage opening.

* * * * *